United States Patent [19]
Hunter et al.

[11] 3,771,369
[45] Nov. 13, 1973

[54] FLUERIC TRANSVERSE-IMPACT MODULATOR ACCELEROMETER

[75] Inventors: Joe S. Hunter, Huntsville; Escar L. Bailey, Athens; Little J. Little, Huntsville, all of Ala.

[73] Assignee: The United States of America as represented by the Secretary of the Army, Washington, D.C.

[22] Filed: June 22, 1972

[21] Appl. No.: 265,416

[52] U.S. Cl. .................................................. 73/515
[51] Int. Cl. ............................................ G01p 15/02
[58] Field of Search ........................................ 73/515

[56] References Cited
UNITED STATES PATENTS
3,515,004  6/1970  Ponterio ............................ 73/515

*Primary Examiner*—James J. Gill
*Attorney*—Harry M. Saragovitz et al.

[57] ABSTRACT

A flueric accelerometer having a housing that defines a fluid impact chamber. Two opposed power input tubes inject power jets into the impact chamber that meet head on and form a radial flow that is in effect a proofmass whose balance point changes when subjected to acceleration forces. Two receiving chambers, one around each input tube, captures a portion of the radial flow. Acceleration forces change the momentum flux of the jets causing the balance point of the radial flow to move; thereby changing the relative portions of radial flow captured by the output receivers to cause a pressure differential between the two output receivers. Pressures in the receivers are detected and a signal indicative of the pressure in each receiver is applied as inputs to a fluid servo amplifier. The amplifier has two outputs that are supplied to control ducts which provide control flows that are applied to the power jets to decrease the momentum of the power jets, as required, and bring the radial flow to a balanced position.

1 Claim, 2 Drawing Figures

PATENTED NOV 13 1973　3,771,369

FLUERIC TRANSVERSE-IMPACT MODULATOR ACCELEROMETER

BACKGROUND OF THE INVENTION

This invention relates in general to fluidic accelerometers and more particularly the invention relates to what is termed a flueric accelerometer, that is one with no moving parts.

Fluidic and flueric components have been of interest, particularly in the missile field, because of their inherent reliability due to the simplicity, ruggedness and lack of sensitivity to environmental conditions such as radiation, temperature, shock and vibration. There are numerous types of fluidic components that are used in various types of control systems, including control systems for missiles, and such systems can be all fluidic or a mix of fluidic and electronic components.

Accelerometers that include gyroscopes are commonly used in missiles and there has been considerable effort and study towards the development of a fluidic accelerometer for use in missiles. Two such fluid accelerometers and their applications are disclosed in U.S. Pat. Nos. 3,201,999 and 3,263,505 assigned to the United States Government. Fluid accelerometers developed previously have generally included at least one moving part and while this is an improvement in simplicity and reliability relative to gyroscopic accelerometers, it is possible to have fluidic accelerometers with no moving parts. There are many fluidic components presently available that have no moving parts and it is desirable to have a flueric accelerometer to use with such components so that the entire fluidic system will have no moving parts.

SUMMARY OF THE INVENTION

An object of the invention is to provide a flueric accelerometer employing a low density fluid medium that makes the accelerometer pratical for use in high G environments that are characteristic of missile applications.

Another object is to provide a fluidic accelerometer whose inherent characteristics are such that it can operate in a high radiation environment without any compromise in performance and reliability.

These and other desireable objectives are achieved by the flueric accelerometer described herein. The accelerometer includes a housing that forms the walls of a fluid impact chamber. Two input tubes having collinear longitudinal axes are each mounted in openings in opposing walls of the housing. The tubes are arranged in an opposed relation and connected to a common source of pressurized fluid, air for example, for injecting two power jets of fluid into the fluid impact chamber. The two jets meet head on and form a radial flow in the fluid impact chamber. The bore or opening around the power input tube forms a receiver for flow from the fluid impact chamber. Each receiver has a pressure pick off means that is connected to one of two input channels to an operational fluid amplifier. The amplifier has two outputs connected to two control ducts that provide conrol flows, one for each power jet, that are applied transversely to the power input jets to maintain the impact point of the two jets in a centered and balanced position in the chamber. The pressure differential that exists between the two outputs of the amplifier is indicative of acceleration forces acting on the accelerometer.

DETAILED DESCRIPTION OF THE INVENTION

Figure 1:
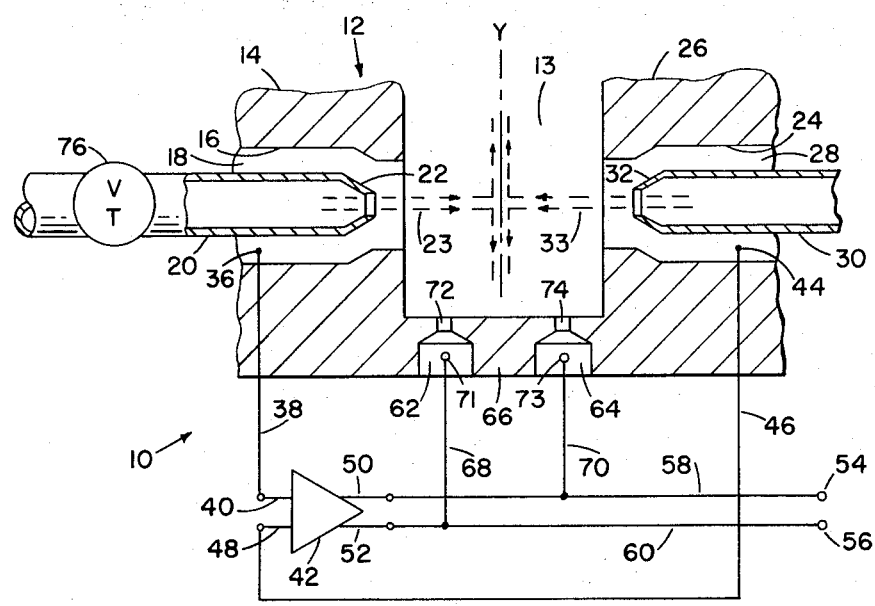
FIG. 1 is a schematic illustration of an accelerometer wherein the control signal is applied to the power input jet as a transverse-impact flow that subtracts from the momentum of the power input flow it impacts.

The accelerometer shown in FIG. 1 includes a housing 12 that can be mounted on a missile or other moveable object on which acceleration information is to be taken. The devices disclosed herein use air as the working medium, however accelerometers constructed in accordance with the invention could utilize other fluids as the working medium. Housing 12 forms a fluid impact chamber 1 and wall 14 of housing 12 has a bore 16 that forms a receiver chamber 18 whose function will be described hereafter. A power input tube 20 mounted in chamber 18 by suitable attachment (not shown) to wall 14 is connected to a suitable source of air under pressure (not shown). An air jet 23 is injected into chamber 13 via tube 20 that includes a converging nozzle section 22 on one end thereof. The air flow is indicated by arrows in FIG. 1.

A second bore 24 in wall 26 of housing 12 forms a second receiver chamber 28. A second power input tube 30 having a nozzle section 32 is mounted in bore 24 and suitably attached (not shown) to wall 26. The two power input tubes are arranged in opposing relation to each other and the longitudinal axes thereof are collinear. Flow of air jet 33 from tube 32 is indicated by arrows in FIG. 1.

T8e accelerometer includes detector means for sensing pressure changes due to acceleration and control means for controlling air jets 23 and 33. Receiving chamber 18 has an opening 36 formed therein for detecting pressure changes. Opening 36 is connected via conduit 38 to input 40 of operational amplifier 42 for applying a signal indicative of the pressure in chamber 18 to amplifier 42. Amplifier 42 is a conventional fluid amplifier. A similar opening 44 in receiver 28 is connected by conduit 46 to input 48 of amplifier 42. Amplifier 42 has two outputs 50 and 52 that are connected to output terminals 54 and 56 by conduits 58 and 60. A pressure differential across outputs 54 and 56 is indicative of the pressure differential between the two receivers. This pressure differential can be monitored by a suitable instrument (not shown).

Figure 2:
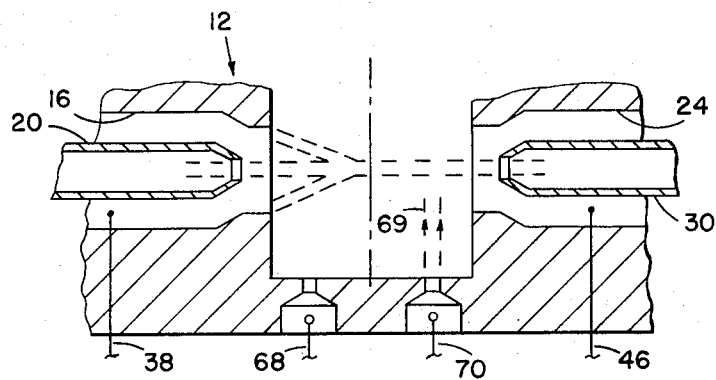
FIG. 2 is a broken away portion of FIG. 1 with arrows showing flow direction when the impact point of the two input power flows has been shifted to the left.

A pair of transverse control ducts 62 and 64 are formed in lower wall 66 of housing 12 for supplying modulating control signal flows, such as flow 69 indicated by arrows in FIG. 2, that impinge on air jets 23 and 33 to selectively reduce the momentum thereof. Control ducts 62 and 64 are supplied with fluid by conduits 68 and 70 that are connected between conduits 58 and 60 and injection ports 71 and 73 formed in the control duct walls. The control ducts discharge their fluid flow into impact chamber 13 via ports 72 and 74 that are positioned in wall 66 so as to be in alignment with the jets from power input tubes 20 and 30.

The operation of the accelerometer shown in FIG. 1 will now be described, assuming that the accelerometer has been mounted on some object being accelerated and the air to the input tubes has been regulated so that jets 23 and 33 meet head on in the center of cavity 13 and form a radial flow along the vertical plane indicated in dotted lines and designated by Y. Fluid flow from power input tube 20 can be regulated to achieve a balanced condition of the two jets by means of throttle valve 76. When the accelerometer is accelerated to the right, as viewed in FIG. 1, the momentum of jet 33 is increased while the momentum of jet 23 is decreased. This momentum change causes the impact point of the two jets to shift to the left and the radial flow is altered as shown in FIG. 2. This flow pattern causes increased amounts of fluid to enter receiver 18 and results in an increase in the pressure therein and since less flow enters chamber 28 the pressure therein is reduced. These changed pressure conditions are communicated through conduits 38 and 46 to amplifier 42 as input signals where they are summed and amplified and delivered as output flows. The output flows are applied as control flows to control ducts 62 and 64 and to output terminals 54 and 56 where a pressure differential will be present across the two terminals anytime the raidal flow in chamber 13 is not balanced. This pressure differential could be monitored if desired by a suitable instrument (not shown). When there is an increased input signal to input 40, the signal at output terminal 50 will increase thus increasing the air flow to orifice 73 and control duct 64. This will result in increased flow from port or nozzle 74 that impinges on air jet 33 to interfere therewith and cause a decrease in momentum flux of the air jet. This causes the impact point of the two air jets to move back towards a balanced condition in the middle of the fluid impact chamber. In this balanced condition the pressure in the two output receiving chambers is the same, however any change in acceleration forces will cause an unbalanced condition of the radial flow which would then be sensed and corrected in the manner discussed above.

What is claimed is:

1. A fluidic accelerometer for measuring acceleration along an axis of the accelerometer comprising:
   a housing that defines a fluid impact chamber,
   a pair of power jet tubes for directing two power jet fluid flows into said fluid impact chamber, said power jet tubes being mounted in said housing in an opposing position so that the longitudinal axes of the tubes coincide and the power jet tubes discharge toward one another so that the fluid flows therefrom meet head on in the fluid impact chamber and form a radial flow cone that tends to move relative to said housing as said accelerometer is subjected to acceleration and deceleration forces,
   a common source of fluid pressure connected to said power jet tubes for supplying fluid thereto,
   detector means for detecting the position of said radial flow cone in said fluid impact chamber and providing a signal that is indicative of the position of said radial flow cone, said detector means including two receiving chambers formed in said housing that are in fluid communication with said fluid impact chamber, said two receiving chambers being positioned so that a receiving chamber is arranged around each power jet tube whereby movement of the radial flow cone in the fluid impact chamber will cause a pressure differential between the two receiving chambers,
   control means that receives a signal from said detector means and develops a control signal for modulating the power jet fluid flow so as to maintain the radial flow cone centered in said fluid impact chamber,
   means for transmitting fluid signals indicative of fluid conditions in said receiving chambers from said receiving chambers to said control means,
   said control means including: a fluidic amplifier means that receives as inputs the signals from the receiving chambers and selectively delivers an output signal in response thereto in the form of two control fluid flows, a first control duct formed in said housing that receives one of the two control fluid flows and discharges a flow into said fluid impact chamber, said first control duct being positioned so that the flow therefrom will impinge on one of said power jet flows at a point ahead of the impact point of the two power jets, a second control duct formed in said housing that receives the other of the two control fluid flows and discharges into said fluid impact chamber, said second control duct being positioned so that flow therefrom will impinge on the other of said power jets at a point ahead of the impact point of the two power jets, whereby the momentum of said power jets can be selectively altered to balance the impact point of the power jet fluid flows and maintain the radial flow cone centered in the fluid impact chamber and
   conduit means connected between said fluid amplifier and the conrol ducts for applying one of the two control fluid flows to said first control duct and the other control fluid flow to said second control duct.

* * * * *